United States Patent
Hu et al.

(10) Patent No.: US 12,146,992 B1
(45) Date of Patent: Nov. 19, 2024

(54) HIGH-ACCURACY, FAST, AND PHASE-BASED LASER RANGING METHOD

(71) Applicant: Beihang University, Beijing (CN)

(72) Inventors: Shuling Hu, Beijing (CN); Bo Wang, Beijing (CN); Binzhi Qi, Beijing (CN); Jiahao Fang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/616,886

(22) Filed: Mar. 26, 2024

(30) Foreign Application Priority Data

Oct. 10, 2023 (CN) .......................... 202311302495.9

(51) Int. Cl.
*G01S 7/4912* (2020.01)
*G01S 7/497* (2006.01)
*G01S 17/34* (2020.01)

(52) U.S. Cl.
CPC ............ *G01S 7/4917* (2013.01); *G01S 7/497* (2013.01); *G01S 17/34* (2020.01)

(58) Field of Classification Search
None
See application file for complete search history.

(56) References Cited

FOREIGN PATENT DOCUMENTS

CN 117031444 B 12/2023

OTHER PUBLICATIONS

Xia, Xianzhao, et al. "Robust noise suppression technique for a LADAR system via eigenvalue-based adaptive filtering." Sensors 19.10 (2019): 2311. (Year: 2019).*
Notification of Grant of Patent for Invention with English Translation, Application No. 202311302495.9, Issue No. 2023111500706890, Applicant: Beijing University of Aeronautics and Astronautics, Dated: Nov. 11, 2023.

* cited by examiner

*Primary Examiner* — Luke D Ratcliffe
(74) *Attorney, Agent, or Firm* — Reising Ethington P.C.

(57) ABSTRACT

The present disclosure provides a high-accuracy, fast, and phase-based laser ranging method. The method includes: S1, obtaining an eigen signal and an avalanche photon diode (APD) echo signal whose phases are different and frequencies are the same; S2, performing, through an adaptive filtering method, denoising on an initial signal, to obtain two denoised signals; S3, separately performing data splitting, reconstitution, and all-phase fast Fourier transform on the denoised signals, to obtain a frequency-phase spectral line of the eigen signal and a frequency-phase spectral line of the APD echo signal; S4, separately traversing maximum phase values of the frequency-phase spectral line of the eigen signal and the frequency-phase spectral line of the APD echo signal, to obtain a phase difference $\Delta\varphi$; S5, converting the phase difference $\Delta\varphi$ into a distance; S6, performing signal mean filtering processing, and S7, performing Kalman filtering processing.

5 Claims, 9 Drawing Sheets

HIGH-ACCURACY, FAST, AND PHASE-BASED LASER RANGING METHOD

CROSS-REFERENCE TO RELATED APPLICATIONS

This patent application claims the benefit and priority of Chinese Patent Application No. 2023113024959, filed with the China National Intellectual Property Administration on Oct. 10, 2023, the disclosure of which is incorporated by reference herein in its entirety as part of the present application.

TECHNICAL FIELD

The present disclosure relates to the field of laser ranging technologies, and in particular to a high-accuracy, fast, and phase-based laser ranging method.

BACKGROUND OF THE INVENTION

As a commonly used measurement technology, laser ranging is widely used in fields such as construction, engineering, manufacturing, geographic surveying, and robotics. Common laser ranging methods include a time-of-flight method, a phase-based method, and a triangulation method. In the time-of-flight method, time for a round trip of laser is calculated, a speed of the laser is not changed, and a distance is calculated. This solution is suitable for measurement of a longer distance, for example, satellite terrain survey, and measurement of a distance between the earth and the moon. In the phase-based method, a phase difference for modulating round-trip laser is calculated, to indirectly calculate a displacement, and a range and accuracy of conversion are changed by changing a frequency for modulating the laser. This solution is suitable for measurement of medium and short distances. This method may be used for precise measurement in a scientific experiment, and may also be used for a long-distance exploration, for example, a laser radar, and a remote sensing device. In the triangulation method, in a similar triangle principle of a paraxial optical path, a position of return light is detected by a high-resolution charge-coupled device (CCD), and then a displacement is calculated in the similar triangle principle. This solution is suitable for measurement of an extremely small range. When a detection distance becomes longer, accuracy decreases seriously. Therefore, this solution is commonly used in surface measurement and a robot vacuum.

As a non-contact measurement solution, a phase-based laser ranging method can avoid damage to a measured surface. The phase-based method calculates a distance value by modulating phase information of a light signal, the range is flexible, and the range can be changed by changing a frequency for modulating the light signal based on a length of a measured object. There are a plurality of solutions for identifying a phase value. An integrated phase resolution chip can be used, and digital phase detection algorithms such as a zero-crossing detection method, a vector inner product method, a fast Fourier transform method, and a full-phase fast Fourier transform method. Different solutions have different phase demodulation accuracy and a different solution speed. Measurement for different distances can be implemented by selecting a frequency for modulating laser and a phase demodulation solution.

An existing phase-based laser ranging method has the following problems. (1) During actual sampling and circuit processing, a sampling signal inevitably has noise, and presence of glitch noise interferes with spectrum conversion and phase identification. (2) During laser ranging, data is usually processed by a single-chip microcontroller. Because calculation space of a small central processing unit (CPU) of the single-chip microcontroller is limited, computation time is long. If the data is long, there is a risk of flash memory overflow. Generally, this problem can be resolved by performing fast Fourier transform on the data. However, when conventional Fourier transform is performed, there is a specific requirement for an array length. The array length must be an integer power of 2. If the array length is not an integer power of 2, there is leakage of a spectrum. The single-chip microcontroller does not guarantee that each sampling may be performed in a complete cycle. In addition, a sampling length is limited, and it is not possible to limitlessly increase the sampling length to meet requirements. (3) Random noise, spikes, and another jump interference generated during data processing affect a distance measurement result. (4) Modulating power of laser drifts because of a temperature, a circuit component is changed because of factors such as an electromagnetic field and a temperature, and external light intensity, a refractive index of a medium, and surface roughness are changed. As a result, a distance measurement result is affected.

During current laser ranging, an output rate of a measurement result of a short distance is low, a distance value is solved only one to three times per second, and measurement of a static object is not affected. However, if an object is in a high-speed movement state, due to a lower solving frequency for measurement, a large error occurs, and detection may not be performed in time. To improve phase resolution progress, sampling bits and signal operation bits need to be added. When solving is performed on a large and long signal, a calculation speed of the CPU slows down. As a result, a final output speed slows down. In addition, in terms of processing accuracy, if accuracy is continuously improved, inevitably, there is a hardware pressure for processing a high frequency signal and a problem of phase identification accuracy. Based on this, it is necessary to improve an existing method for converting a distance measurement signal into a distance value.

SUMMARY OF THE INVENTION

An objective of the present disclosure is to provide a high-accuracy, fast, and phased-based laser ranging method, to solve a phase-based displacement output value in a fast and high-accuracy manner.

For this purpose, the technical solutions of the present disclosure are as follows:

A high-accuracy, fast, and phase-based laser ranging method includes:
  S1, transmitting a laser signal $f_1(t)$ to a to-be-measured object through a laser diode, and receiving an echo signal $f_2(t)$ through an avalanche photon diode (APD), to obtain an eigen signal $e_1(t)$ and an APD echo signal $e_2(t)$ whose phases are different and frequencies are the same;
  S2, performing, through an adaptive filtering method, denoising on the eigen signal $e_1(t)$ and the APD echo signal $e_2(t)$ that are obtained in step S1, to obtain a denoised eigen signal $e'_1(t)$ and a denoised APD echo signal $e'_2(t)$;
  S3, separately performing data splitting, reconstitution, and all-phase fast Fourier transform on the denoised eigen signal $e'_1(t)$ and the denoised APD echo signal $e'_2(t)$, to obtain an eigen signal frequency-phase spectral line $Y_1(K)$ and an APD echo signal frequency-phase spectral line $Y_2(K)$, where step S3 specifically includes:

S301, substituting an array length n of a to-be-processed signal $x(n)=[x(-N+1), \ldots, x(0), \ldots, x(N-1)]$ into a formula: $n=2N-1$, to obtain an integer result of N, and splitting an array of the to-be-processed signal into N subarrays, where each subarray includes N pieces of data and center point data, and the center point data is one piece of data located at a center position of the subarray;

S302, arranging, in a manner of aligning with the center point data, the N subarrays obtained in step S301;

S303, performing periodic extension on the N subarrays based on the center point data, to obtain N subarrays with an array length of $2N-1$;

S304, performing truncation, through a rectangular window with a length of N, on the N subarrays with an array length of $2N-1$ backward starting from the center point data, to obtain N subarrays with an array length of N and that are located in the rectangular window; and S305, performing Fourier transform and summing by bits on the N subarrays obtained in step S304, to obtain a frequency-phase spectral line, with a formula as follows:

$$Y_r(K) = \sum_{r=0}^{N-1} w_c(r)S'_r(K) = \sum_{r=0}^{N-1} w_c(r)S_r(K)e^{j\frac{2\pi}{N}rk},$$

where
$w_c$ represents a rectangular convolution window, $$w_c(n') = \begin{cases} \sum_{k=0}^{N-1-n'} w_1(k)w_2(k+n') & (n' \in [0, N-1]) \\ \sum_{k=-n'}^{N-1} w_1(k)w_2(k+n') & (n' \in [0, N-1]) \end{cases},$$

$w_1$ and $w_2$ represent convolution window functions, r represents a serial number of a subarray, k represents a serial number of data of the subarray, and K represents a value of a serial number of a spectral; $S'_r(K)$ represents results obtained by performing discrete fast Fourier transform on the subarrays obtained in step S304, $S_r(K)$ represents the subarrays obtained in step S301; and n' represents the array length of the subarray obtained in step S304;

S4, traversing the eigen signal frequency-phase spectral line $Y/(K)$, to obtain a maximum phase value $\varphi_{1max}$; traversing the APD echo signal frequency-phase spectral line $Y_2(K)$, to obtain a maximum phase value $\varphi_{2max}$; and performing calculation based on a formula $\Delta\varphi = \varphi_{1max} - \varphi_{2max}$, to obtain a phase difference $\Delta\varphi$;

S5, substituting the phase difference $\Delta\varphi$ obtained in step S4 into a formula $$L = \frac{\Delta\varphi}{2\pi} \cdot \frac{c}{2f_{Laser}},$$

to convert the phase difference $\Delta\varphi$ into a displacement L, where c represents a propagation speed of laser in atmosphere; $f_{Laser}$ represents a frequency for modulating a laser signal, and a substitution value of $f_{Laser}$ is the laser signal $f_1(t)$ in step S1;

S6, performing signal mean filtering processing on the displacement Z obtained through solving in a time sequence in step S5, to obtain a mean filtering distance $\overline{L}$; and S7, performing Kalman filtering processing on the mean filtering distance $\overline{L}$ obtained in step S6, to obtain a Kalman filtering distance $\hat{L}$.

Further, step S2 specifically includes: separately substituting the eigen signal $e_1(t)$ and the APD echo signal $e_2(t)$ into an adaptive filtering formula:

$$\nabla J = \frac{\partial(e^2(n))}{\partial w(n)} = -2e(n)x(n)$$

$$y(n) = w^T(n)x(n)$$

$$e(n) = d(n) - y(n)$$

$$w(n+1) = w(n) - 2\mu\nabla J$$

$\nabla J$ represents a filter coefficient gradient; $x(n)$ represents a signal with sampling noise, that is, $e_1(t)$ and $e_2(t)$; $w(n)$ represents a digital filter; $d(n)$ represents a desired signal; $e(n)$ represents an error value; $y(n)$ represents an output signal, that is, the denoised eigen signal $e'_1(t)$ and the denoised APD echo signal $e'_2(t)$; n represents an array length of a signal; and $\mu$ represents a step factor.

Further, the S6, performing signal mean filtering processing includes:

substituting the result obtained through solving in step S5 into a mean filtering processing formula:

$$\overline{L} = \frac{p}{2}\sum_{i=1}^{p/2} L_i,$$

where
$\overline{L}$ represents a mean filtering distance, p represents a quantity of L; input within 1 s, and $L_i$ represents an $i^{th}$ distance value obtained through solving in a unit time, specifically the displacement L obtained through solving in a time sequence in step S5.

Further, the S7, performing Kalman filtering processing includes: determining the mean filtering distance $\overline{L}$ obtained in step S6 as an input for Kalman filtering, and substituting the mean filtering distance $\overline{L}$ into a Kalman filtering equation, where the Kalman filtering equation is as follows:

$$x_q = Ax_{q-1} + Bu_q,$$

$$z_q = H_q x_q + v_q,$$

$$P_{\bar{q}} = AP_{q-1}A^T + Q,$$

$$K_q = \frac{P_{\bar{q}}H^T}{HP_{\bar{q}}H^T + R},$$

$$\hat{x}_1 = \hat{x}_{\bar{q}} + K_q(z_q - H\hat{x}_{\bar{q}}),$$

$$P_q = (I - K_q H)P_{\bar{q}}, \text{ where}$$

$x_q$ represents a prior distance value obtained by performing Kalman filtering processing at a time point q, A represents a target state transfer matrix, $x_{q-1}$ represents an input value without performing Kalman filtering processing at a time point q−1, and is specifically substituted into the processing result $\bar{L}$ obtained in step S6; B represents a matrix that converts an input distance into a state, $u_q$ represents a control vector, $z_q$ represents a measurement vector, H represents a transformation matrix from a state vector to a measurement vector, $v_q$ represents noise conforming to Gaussian distribution, $\hat{x}_{\bar{q}}$ represents a prior state estimation value at the time point q, and $\hat{x}_q$ represents an output value obtained by performing Kalman filtering processing at the time point q; $P_{\bar{q}}$ represents a covariance of $\hat{x}_{\bar{q}}$ at the time point q, $P_q$ represents a covariance of $\hat{x}_q$ at the time point q, $P_{q-1}$ represents a covariance of $\hat{x}_q$ at the time point q−1, $A^T$ represents transpose of a state transfer matrix A, Q represents a covariance matrix of system noise, $K_q$ represents a Kalman gain, $H^T$ represents transpose of a matrix H, R represents a covariance matrix for ranging noise, and/represents a unit matrix; and the output result $\hat{x}_q$ is a distance value $\hat{L}$ obtained by performing Kalman filtering processing.

Further, in step 7, the covariance matrix of system noise is Q=[0.02], and the covariance matrix for ranging noise is R=[10].

Compared with the prior art, the high-accuracy, fast, and phase-based laser ranging method has the following beneficial effect. (1) In the method, adaptive filtering processing is performed on the initial sampled signal, so that a signal-to-noise ratio (SNR) of the signal is significantly improved. Compared with an SNR of about SNR=10 obtained after conventional ADC sampling, an SNR obtained after processing in this step can be increased to SNR≥40. (2) In the method, pre-processing of splitting, arrangement, window convolution, and subsequent full-phase Fourier transform are sequentially performed on the signal data, leakage of the spectral generated by performing ordinary Fourier transform is effectively suppressed, errors are reduced, and more complete phase information is obtained. Compared with a variance of about 0.5 of fast Fourier transform, a variance of full-phase Fourier transform floats around 0, that is, there is almost no phase error. In addition, in the processing step, an amount of computation of Fourier transform is reduced. Because a quantity of sampling points is N, the amount of computation in the present disclosure is reduced to $$\frac{N}{2}\log_2^N$$

times in comparison with conventional $N^2$ times. (3) In the method, mean filter processing and Kalman filtering processing are performed on the distance result based on the phase difference, stability of the data is further improved. In conclusion, compared with the existing processing method, standard deviations of jitter and noise at the distance measurement point are ≥0.6. In the method in the present disclosure, he standard deviations of jitter and noise at the distance measurement point are ≤0.05, and stability of the data is greatly improved. In addition, a data output speed is 20 times faster than that of the existing method, to achieve the objective of outputting the displacement value in a fast and high-accuracy manner.

DETAILED DESCRIPTION OF THE INVENTION

The present disclosure will be described in more detail below with reference to the accompanying drawings and specific embodiments, but these embodiments are not intended to limit the present disclosure.

Figure 1:
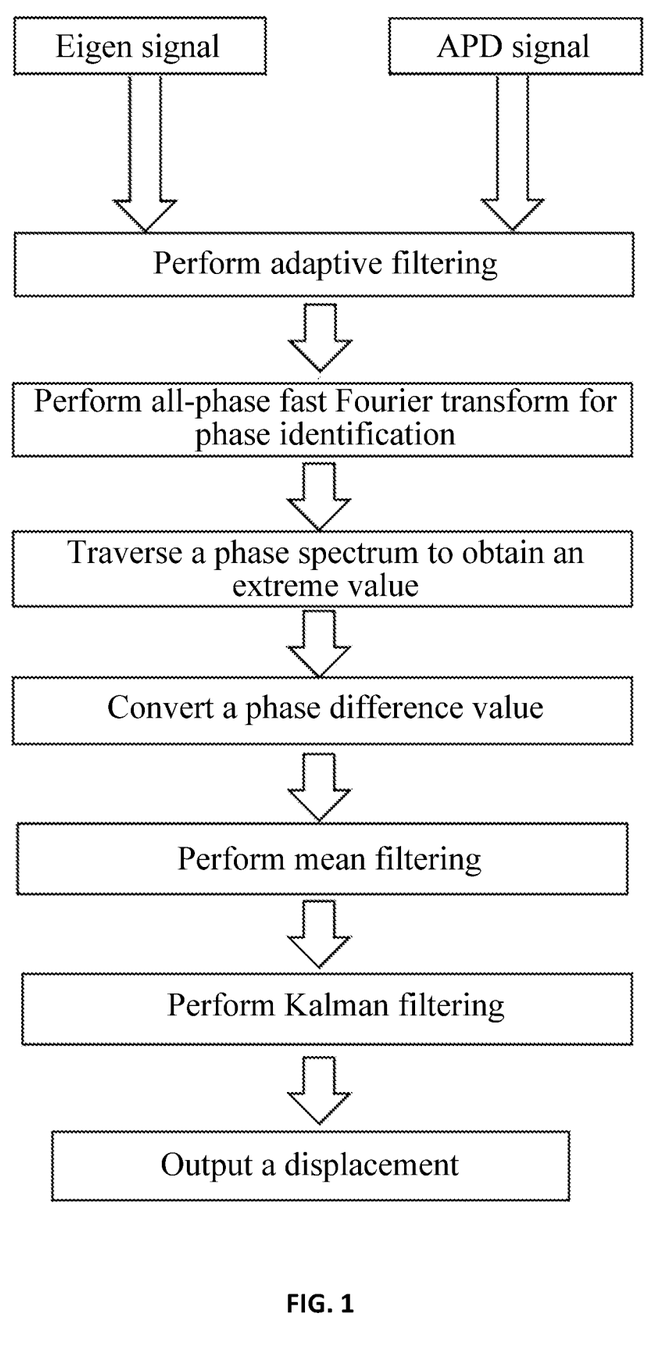
FIG. 1 is a flowchart of a high-accuracy, fast, and phase-based laser ranging method according to the present disclosure.

Referring to FIG. 1, a high-accuracy, fast, and phase-based laser ranging method specifically includes the following steps.

S1: Acquire signals.

Transmit a laser signal $f_1(t)$ to a to-be-measured object through a laser diode, receive an echo signal $f_2(t)$ through an avalanche photon diode (APD), perform frequency-mixing processing on the laser signal $f_1(t)$, to obtain an eigen signal $e_1(t)$ that may be acquired by a single-chip microcomputer, and perform frequency-mixing processing on the echo signal $f_2(t)$, to obtain an APD echo signal $e_2(t)$ that may be acquired by the single-chip microcomputer, where the eigen signal $e_1(t)$ and the APD echo signal $e_2(t)$ are signals whose phases are different and frequencies are the same.

S2: Perform denoising.

Figure 2:
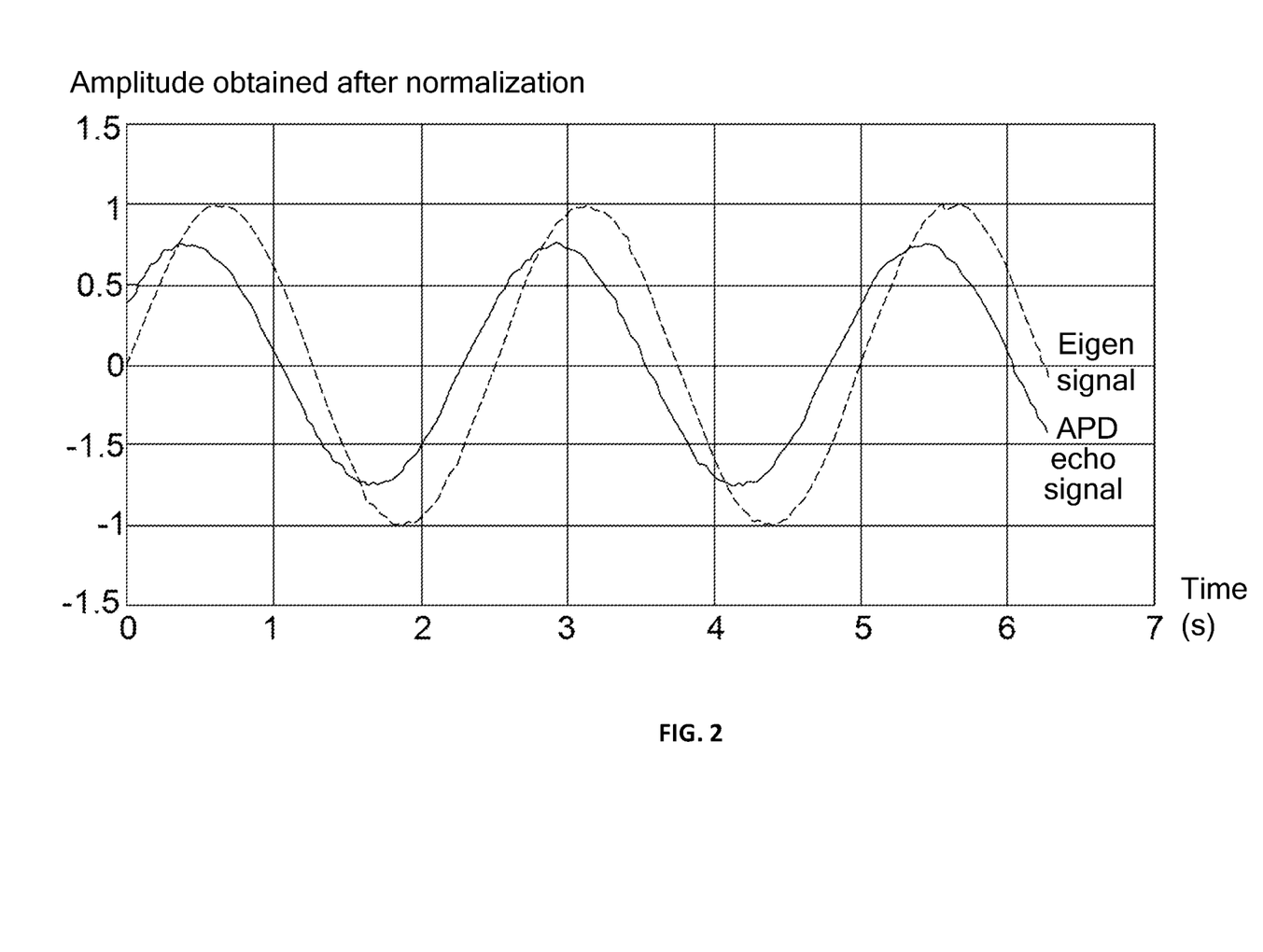
FIG. 2 is a waveform diagram of an eigen signal and an APD echo signal acquired in step S1 of a high-accuracy, fast, and phase-based laser ranging method according to the present disclosure.

During actual sampling, sampled signals have noise during sampling and circuit processing. That is, as shown in FIG. 2, waveform curves of the eigen signal and the APD echo signal are not smooth. If a waveform with glitch noise is directly used for phase identification, noise in the signal interferes with spectral transform and phase identification. In addition, due to the noise, a frequency of the signal becomes complex, and greatly interferes with subsequent displacement transform. Therefore, denoising is first performed on the two sampled signals.

In step S2, the noise in the signal is removed through adaptive filtering, to obtain a smoother waveform signal.

Specifically, denoising in step S2 includes the following steps.

S201: When a signal with sampling noise is defined as x(n), a desired signal is defined as d(n), an output signal is defined as y(n), e(n) represents an error value, e(n)=d(n)−y(n), a digital filter is defined as w(n), and n represents an array length of a signal, that is, a quantity of data points included in the signal.

The output signal y(n) is expressed as follows:

$$y(n)=x^T(n)w(n)=w^T(n)x(n),$$

the error value e(n) is expressed as follows:

$$e(n)=d(n)-y(n)=d(n)-w^T(n)x(n), \text{ and}$$

a mean-square error J is expressed as follows:

$$J=E[e^2(n)]=E[d^2(n)]+w^T(n)E[x(n)x^T(n)]w(n)-2E[d(n)x^T(n)]w(n).$$

S202: Based on a steepest descent algorithm, adjust a strong power vector of a filter along a steepest descent direction (a negative gradient direction) of a performance surface, search for a minimum point of the performance surface, and perform solving on a transient tap vector (a filter coefficient) based on a transient mean-square error, to obtain a gradient ∇J, where a formula is as follows:

$$\nabla J = \frac{\partial (e^2(n))}{\partial w(n)} = -2e(n)x(n),$$

and a formula for a computational iterative process through an adaptive filtering algorithm is as follows:

$$y(n)=w^T(n)x(n)$$

$$e(n)=d(n)-y(n)$$

$$w(n+1)=w(n)-2\mu\nabla J, \text{ where}$$

u represents a step length.

Based on the foregoing iterative formula, the filter coefficient is continuously updated during iteration, so that a final output result is a denoised and smoothed signal.

S203: Take an eigen signal with sampling noise $e_1(t)$ and an APD echo signal $e_2(t)$ with sampling noise as signals x(n) with sampling noise, and respectively substitute the signals x(n) with sampling noise into step S201 and S202, to respectively obtain an eigen signal $e'_1(t)$ obtained after adaptive filtering and an APD echo signal $e'_2(t)$ obtained after adaptive filtering, where the array length n is preferably 512, and the desired signal d(n) is a custom parameter and is input as an input value.

Figure 3:
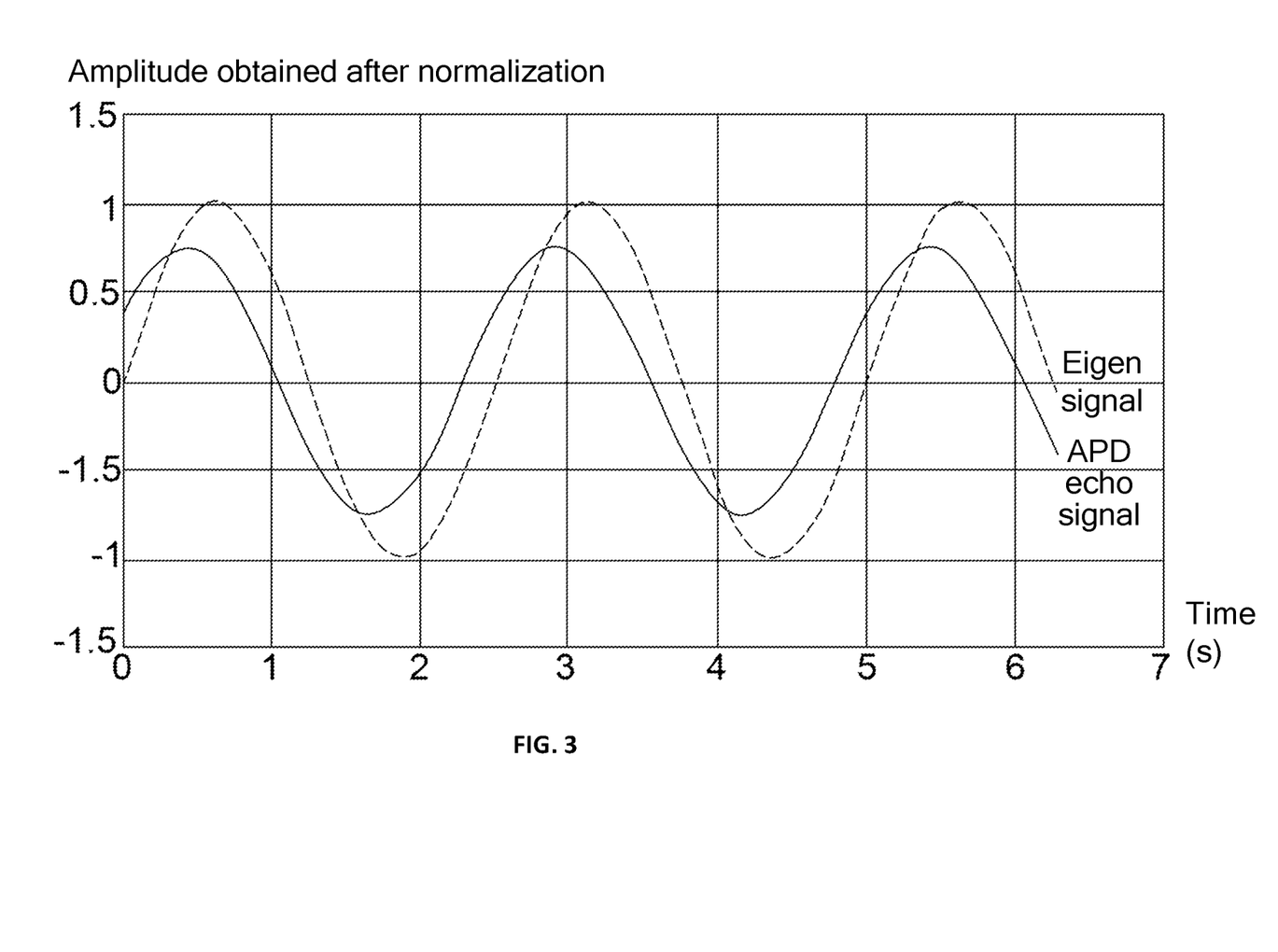
FIG. 3 is a waveform diagram of an eigen signal and an APD echo signal obtained through processing in step S2 of a high-accuracy, fast, and phase-based laser ranging method according to the present disclosure.

As shown in FIG. 3, after denoising in step S2, the waveform curves of the eigen signal and the APD echo signal are smooth waveform curves. In comparison with FIG. 2, glitches and noise in the waveform curves of the denoised signal are significantly reduced, a signal-to-noise ratio (SNR) is improved, and a sampling error is suppressed.

S3: Perform full-phase fast Fourier transform.

After the sampled signal is processed by adaptive filtering in step S2, a smooth waveform is obtained. However, because the signal is sampled by an ADC module, data of the signal is a discrete array. Therefore, the smooth waveform may not be directly used for Fourier transform and phase identification, and splitting, arrangement, and window convolution are performed to implement full-phase Fourier transform. In addition, for small CPUs with limited calculation space, such as a single-chip microcomputer, a calculation speed of the central processing unit is long. If the data is long, there is a risk of flash memory overflow. Therefore, a sampling signal obtained after adaptive filtering is performed in step 2 may be implemented by performing fast Fourier transform is performed to eliminate the risk. Based on periodicity, conjugate symmetry, and periodicity of Fourier transform, calculation of Fourier transform is greatly reduced. However, when conventional Fourier transform is performed, there is a specific requirement for an array length. The array length must be an integer power of 2. If the array length is not an integer power of 2, there is leakage of a spectrum. The single-chip microcontroller does not guarantee that each sampling may be performed in a complete cycle. In addition, a sampling length is limited, and it is not possible to limitlessly increase the sampling length to meet requirements. Full-phase fast Fourier transform performed in step S3 resolves this problem.

In step S3, the denoised eigen-signal $e'_1(t)$ and the denoised APD echo signal $e'_2(t)$ obtained after adaptive filtering processing are similarly processed independently.

Specifically, processing on any signal in step S3 includes the following steps.

S301: Substitute an array length n of a to-be-processed signal x(n)=[x(−N+1), . . . , x(0), . . . , x(N−1)] into n=2N−1, to obtain a value of N, where if the value of N is a decimal, the value is rounded; and split an array of the to-be-processed signal into N subarrays, where each subarray includes N pieces of data.

After splitting processing is performed on the data in step S301, the array is split into N subarrays, and each subarray includes N pieces of data. The N subarrays are not duplicated, and each subarray includes center point data. The center point data is a piece of data located in a center of the subarray (when n is an odd number, the center point data is unique data located in the center of the array; or when n is an even number, the center point data is any of two pieces of data that are parallelly located in the center of the array). Specifically, splitting processing performed on the data is schematically illustrated as follows:

First subarray: x(0) x(1) . . . x(N−1)
Second subarray: x(−1) x(0) . . . x(N−2)
. . .
$(N-1)^{th}$ subarray: x(−N+2) . . . x(0) x(1)
$N^{th}$ subarray: x(−N+1) x(−N+2) . . . x(0)

Further, each subarray may be expressed as follows:

$$s_r(k) = \frac{1}{2}ae^{j(2\pi m(k-r)+\theta)} \quad (r, k \in [0, N-1]),$$

where a represents a signal amplitude, e represents a natural constant, j represents an imaginary unit, m represents an angular frequency, θ represents a phase angle, r represents a serial number of the subarray, and k represents a serial number of data in the subarray.

S302, arranging, in a manner of aligning with the center point data, the N subarrays obtained in step S301;

S303, performing periodic extension on the N subarrays based on the center point data, to obtain N subarrays with an array length of 2N−1;

S304, performing truncation, through a rectangular window with a length of N, on the N subarrays with an array length of 2N−1 backward starting from the center point data, to obtain N subarrays with an array length of N and that are located in the rectangular window; and S305, performing Fourier transform and summing by bits on the N subarrays obtained in step S304, to obtain a frequency-phase spectral line, with a formula as follows:

$$Y_r(K) = \sum_{r=0}^{N-1} w_c(r) S'_r(K) = \sum_{r=0}^{N-1} w_c(r) S_r(K) e^{j\frac{2\pi}{N}rk},$$

where
$w_c$ represents a rectangular convolution window, $$w_c(n') = \begin{cases} \sum_{k=0}^{N-1-n'} w_1(k) w_2(k+n') & (n' \in [0, N-1]) \\ \sum_{k=-n'}^{N-1} w_1(k) w_2(k+n') & (n' \in [0, N-1]) \end{cases},$$

where
$w_1$ and $w_2$ represent convolution window functions, a rectangular window is used as a convolution window in this embodiment, r represents a serial number of a subarray, k represents a serial number of data of the subarray, and K represents a value of a serial number of a spectral; $S'_r(K)$ represents results obtained by performing discrete fast Fourier transform on the subarrays obtained in step S304, and a formula is $$S'_r(K) = S_r(K) e^{j\frac{2\pi}{N}rk} \quad (r, k \in [0, N-1]);$$

$S_r(K)$ represents the subarrays obtained in step S301; and n' represents the array length of the subarray obtained in step S304.

In this step, rearrangement processing and re-splitting processing are performed to obtain new N subarrays, and Fourier transform and window accumulation are performed when Fourier transform is performed. In comparison with an array length of an initial signal, a quantity of pieces of data in this step is reduced to n'=N−1 from n=2N−1, so that to-be-processed amount of the data is greatly reduced. In addition, Fourier transform is performed, the denoised signals obtained in step S2 are finally converted into frequency-phase spectral lines.

Figure 4:
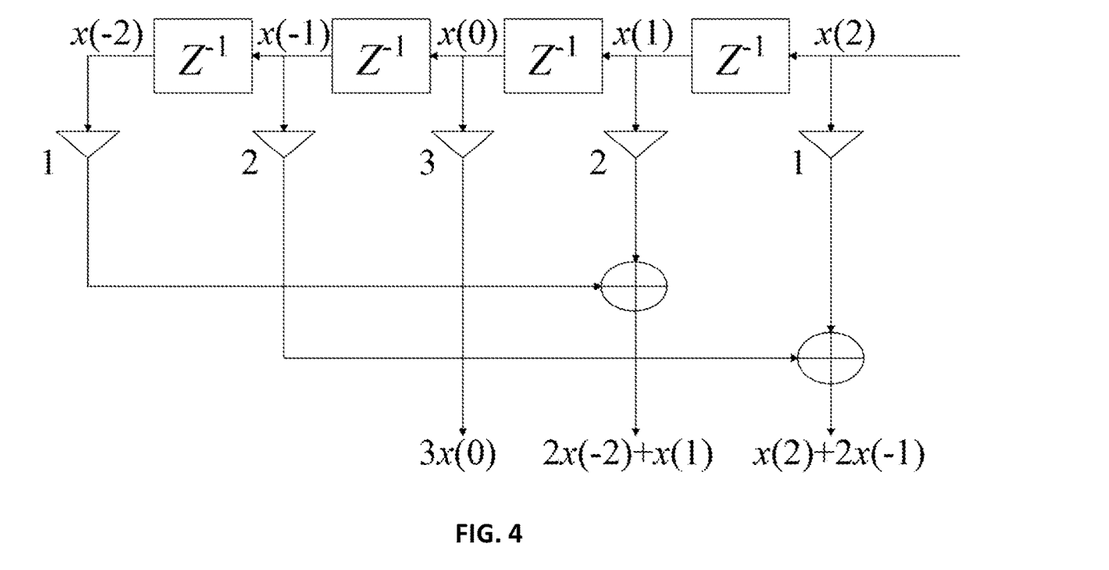
FIG. 4 is a flowchart of step S3 of processing through a rectangular window of a high-accuracy, fast, and phase-based laser ranging method according to the present disclosure.

Specifically, referring to FIG. 4, an array length n=5 of any signal is used as an example for demonstration of processing in step S301 to step S305.

(1) Substitute n=5 into the n=2N−1, to obtain a value of N=3 through calculation, and split an array x(5)=[x(−2), x(−1), x(0), x(1)] of the to-be-processed signal into three subarrays, where each subarray includes three pieces of data, and the three pieces of data include center point data x(0).

(2) Arrange the N subarrays in a manner of aligning with the center point data x(0) as follows:
First subarray: x(0) x(1) x(2)
Second subarray: x(−1) x(0) x(1)
Third subarray: x(−2) x(−1) x(0)

(3) Based on the center point data x(0), perform periodic extension on three subarrays in step (2):
First subarray: x(1) x(2) x(0) x(1) x(2)
Second subarray: x(1) x(−1) x(0) x(1) x(−1)
Third subarray: x(−2) x(−1) x(0) x(−2) x(−1)

(4) Perform truncation, through a rectangular window with a length of 3, on three subarrays with an array length of 5 backward starting from center point data x(2), to obtain 3 subarrays with an array length of 3 and that are located in the rectangular window:
First subarray: x(0) x(1) x(2)
Second subarray: x(0) x(1) x(−1)
Third subarray: x(0) x(−2) x(−1)

(5) Perform Fourier transform and sum by bits sequentially on the three subarrays obtained in step (4), where a process of summing by bits may be schematically illustrated as follows: $x_1(3)=[x'(0), x'(1), x'(2)]$, $x'(0)=3x(0)$, $x'(1)=x(−2)+2x(1)$, $x'(2)=x(2)+2x(−1)$; and finally, convert a voltage-time domain signal into a phase-frequency domain signal.

In step S3, $w_1=w_2$ is used as an example, and the foregoing Fourier transform formula is further expanded:

$$\begin{aligned} Y_r(k_f) &= \sum_{r=0}^{N-1} w_1(r) \left[ \sum_{n=0}^{N-1} w_1(n) s_r(n) W_N^{nk} \right] e^{j\frac{2\pi}{N}rk} \\ &= \sum_{r=0}^{N-1} w_1(r) \left[ \sum_{n=0}^{N-1} w_1(n) s(n-r) W_N^{nk} \right] e^{j\frac{2\pi}{N}rk} \\ &= \sum_{r=0}^{N-1} w_1(r) \left[ \sum_{n=0}^{N-1} w_1(n) \frac{1}{2} a e^{j\theta} e^{j2\pi m(n-r)} e^{-j\frac{2\pi}{N}nk} \right] e^{j\frac{2\pi}{N}rk} \\ &= \frac{1}{2} a e^{j\theta} \sum_{r=0}^{N-1} w_1(r) e^{2\pi j\left(\frac{k}{N}-m\right)r} \sum_{n=0}^{N-1} w_1(n) e^{-2\pi j\left(\frac{k}{N}-m\right)n} \end{aligned}$$

It may be learned from the foregoing final expansion formula that, for a transform result of the array at K of the spectral line, an amplitude is $A_{apFFT}=2|Y_r(K)|$, a phase is θ, and no phase error value exists, reflecting phase invariance of full-phase Fourier transform in step S3.

Figure 5:
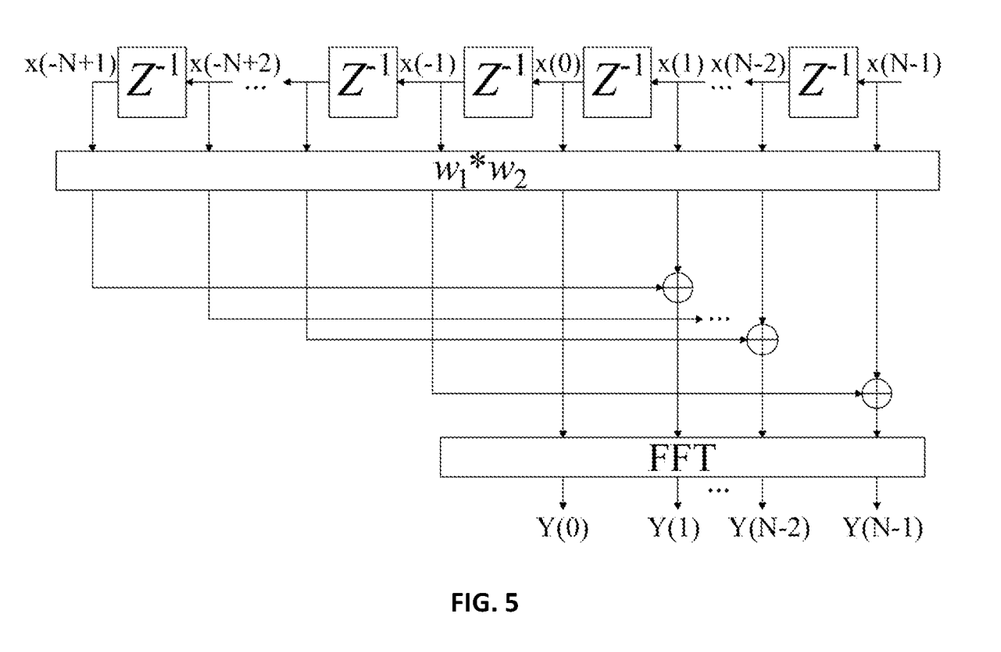
FIG. 5 is a flowchart of step S4 of performing all-phase fast Fourier transform of a high-accuracy, fast, and phase-based laser ranging method according to the present disclosure.

Referring to FIG. 5, during full-phase Fourier transform in this step, data splitting, reconstitution, Fourier transform, and summing by bits are separately performed on the signals e'₁(t) and e'₂(t), and signals having (2N−1) pieces of discrete data segments are finally processed into spectral-phase curves obtained by performing full-phase fast Fourier transform, namely, the eigen signal frequency-phase spectral line $Y_1(K)$ and the APD echo signal frequency-phase spectral line $Y_2(K)$.

In step S3, the signal obtained by performing full-phase fast Fourier transform is changed to a phase-frequency domain signal from a voltage-time domain signal, the phase-frequency domain signal is traversed at various points, to obtain a largest phase value, and a phase value is converted into a displacement value based on a relationship between a displacement and a phase in a principle of laser ranging. In comparison with existing fast Fourier transform, this step includes advantages of fast Fourier transform, and spectral leakage during fast Fourier transform is suppressed well, which gives full play to phase invariance of full-phase fast Fourier transform.

S4: Calculate a phase difference.

Figure 6:
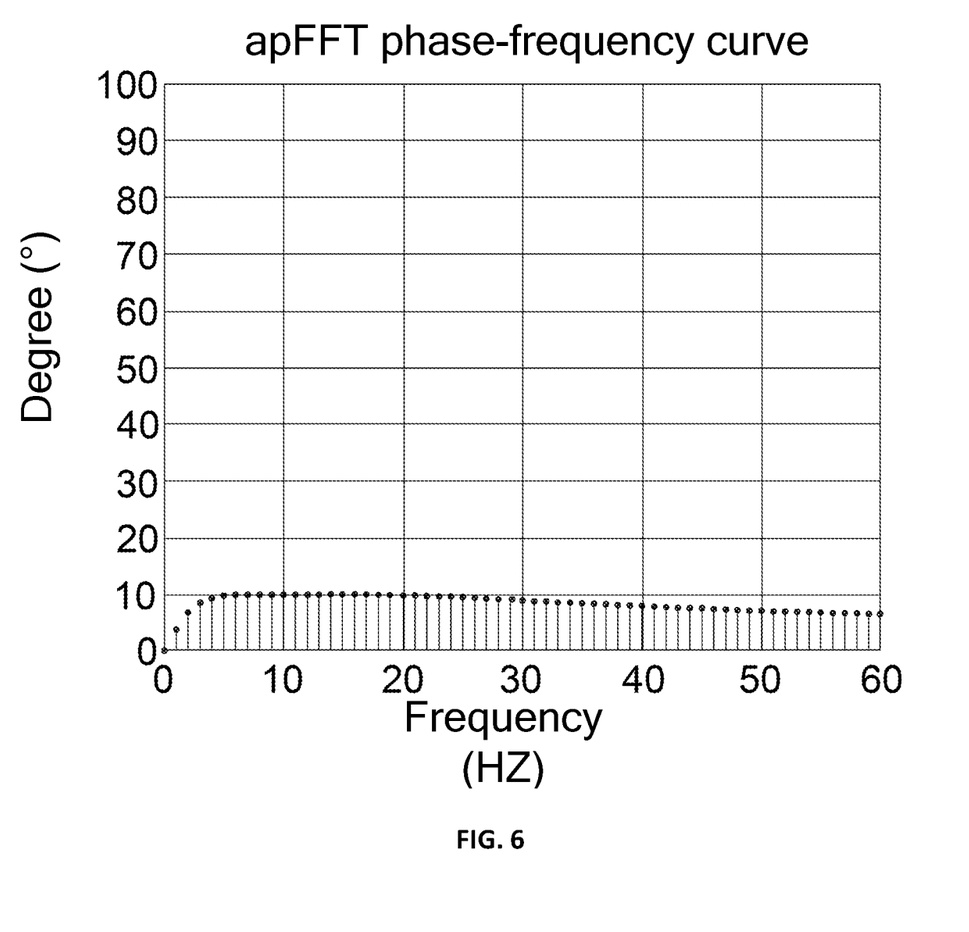
FIG. 6 is a schematic diagram of a frequency-phase spectral line of an eigen signal obtained in step S3 of a high-accuracy, fast, and phase-based laser ranging method according to the present disclosure.

After step S3, an original time-domain e'(t) curve becomes a phase-frequency spectral line in a frequency domain. Referring to FIG. 6, an image includes phase information at each frequency point. If the signal is a desired pure waveform without another frequency component, one frequency exists, only a phase value at a single frequency needs to be read, and phase values of the two signals are subtracted, to obtain a phase difference value. However, due to noise and signal modulation, a single frequency curve of an actual signal cannot be obtained after filtering. Therefore, phase values at points need to be traversed, to calculate a phase value at a point at which phase response is largest.

Specifically, step S4 includes:

S401: Traverse the eigen signal frequency-phase spectral line $Y_1(K)$, to obtain a maximum phase value $\varphi_{1max}$.

S402: Traverse the APD echo signal frequency-phase spectral line $Y_2(K)$, to obtain a maximum phase value $\varphi_{2max}$.

S403: Perform calculation according to a formula $\Delta\varphi = \varphi_{1max} - \varphi_{2max}$, to obtain a $\Delta\varphi$.

S5: Convert the phase difference into a distance.

In a principle of phase-based laser ranging, a range of laser ranging is determined based on a modulating frequency. A propagation speed of laser is a constant value of c in atmosphere. It is assumed that duration from a time point at which the laser is emitted to a time point at which the laser is returned to a receiver is t, a to-be-measured distance L is expressed as follows: $L = \frac{1}{2}ct$.

During propagation, a flight time of the laser corresponds to a plurality of complete cycles and an incomplete cycle, that is, $\Phi = N + \Delta N = 2\pi \cdot n + \varphi$, where $\varphi$ presents a value of an angle that corresponds to the incomplete cycle, that is, a phase difference value for modulating the signal.

The foregoing calculation formula may further be expanded as $\Phi = w \cdot t = 2\pi \cdot t/T = 2\pi \cdot f \cdot t$.

Therefore, the to-be-measured distance L may be expressed as $$L = \frac{1}{2}c \cdot \frac{\Phi}{2\pi f} = \frac{1}{2} \cdot \frac{c}{f} \cdot \frac{(2\pi \cdot n + \varphi)}{2\pi} = \frac{1}{2}\lambda\left(N + \frac{\varphi}{2\pi}\right),$$

where N represents a quantity of complete cycles, and this distance is referred to as a fuzzy distance. $\varphi$ corresponds the incomplete cycles, and a corresponding distance value may be obtained by calculating the phase difference.

Based on a range detected at a single frequency, a relationship between a frequency and a range is $f_s = c/2L_s$, where $f_{Laser}$ represents a frequency for modulating a laser signal, and $L_{Laser}$ represents a detection range.

Finally, a calculation formula for performing conversion based on the phase difference $\Delta\varphi$ to obtain the displacement L is as follows:

$$L = \frac{\Delta\varphi}{2\pi} \cdot \frac{c}{2f_{Laser}},$$

where $\Delta\varphi$ represents the phase difference, and is obtained after being substituted in step S5; c represents the propagation speed of the laser in the atmosphere; and $f_{Laser}$ represents the frequency for modulating the laser signal, specifically the laser signal $f_1(t)$ substituted in step S1.

S6: Perform mean value filtering processing.

Mean value filtering processing needs to be performed on a distance result L obtained in step S6. To be specific, need to carry out mean value filtering processing, that is, random noise, spikes, and another jump interference in the result are filtered. During mean value filtering processing, to ensure that an output speed is not affected, a length of a mean value filtering window is set to half of a quantity of outputs per second, and a specific calculation formula is as follows:

$$\overline{L} = \frac{p}{2}\sum_{i=1}^{p/2} L_i,$$

where $\overline{L}$ represents a mean filtering distance, p represents a quantity of $L_i$ input within 1 s, and $L_i$ represents an $i^{th}$ distance value obtained through solving in a unit time, specifically the displacement L obtained through solving in a time sequence in step S5.

S7: Perform Kalman filtering processing:

Because the displacement value may be affected by an error and noise when being directly output, output stability is poor. Modulating power of laser drifts because of a temperature, a circuit component is changed because of factors such as electromagnetism and a temperature, and external light intensity, a refractive index of a medium, and surface roughness are changed. As a result, a distance measurement result is affected. Impact on the distance measurement result is reflected in constant jitter of the data. Therefore, after a mean filtering distance is obtained in step S7, to suppress or reduce impact in the foregoing content, sub-millimeter level accuracy needs to be achieved. Kalman filtering processing is further performed in the method of the present disclosure, to further implement high-accuracy distance measurement, and avoid greater impact of interference of an external environment on accuracy and stability of an instrument. In addition, during Kalman filtering processing, only a value of a previous state and a value of a current state need to be recorded, more space does not need to be invoked to store historical values for calculation. Therefore, Kalman filtering processing is suitable for a core with little internal memory space, for example, a single-chip microcontroller.

In step S7, a mean filtering distance $\overline{L}$ obtained in step S6 is used as an input of Kalman filtering processing, and substituted into a Kalman filtering equation. The Kalman filtering equation is as follows:

$x_q = Ax_{q-1} + Bu_q,$ $z_q = Hx_q + v_q,$ $P_{\overline{q}} = AP_{q-1}A^T + Q,$ $$K_q = \frac{P_{\overline{q}}H^T}{HP_{\overline{q}}H^T + R},$$

$\hat{x}_q = \hat{x}_{\overline{q}} + K_q(z_q - H\hat{x}_{\overline{q}}),$ $P_q = (I - K_qH)P_{\overline{q}},$ where $x_q$ a represents a prior distance value obtained by performing Kalman filtering processing at a time point q, A represents a state transfer matrix, and is a conjectural model of conversion on a target state, $x_{q-1}$ represents an input value without performing Kalman filtering processing at a time point q−1, and is specifically substituted into the processing result $\overline{L}$ obtained in step S6; B represents a matrix that converts an input distance into a state, $u_q$ represents a control vector, $z_q$ represents a measurement vector, H represents a transformation matrix from a state vector to a measurement vector, $v_q$ represents noise conforming to Gaussian distribution, $\hat{x}_{\bar{q}}$ represents a prior state estimation value at the time point q, and $\hat{x}_q$ represents an output value obtained by performing Kalman filtering processing at the time point q; $P_{\bar{q}}$ represents a covariance of $\hat{x}_{\bar{q}}$ at the time point q, $P_q$ represents a covariance of $\hat{x}_q$ at the time point q, $P_{q-1}$ represents a covariance of $\hat{x}_q$ at the time point q−1, $A^T$ represents transpose of a state transfer matrix A, Q represents a covariance matrix of system noise, and is set to Q=[0.02]; $K_q$ a represents a Kalman gain, $H^T$ represents transpose of a matrix H, R represents a covariance matrix for ranging noise, and is set to R=[10]; and/represents a unit matrix; and the output result $\hat{x}_q$ is a distance value $\hat{L}$ obtained by performing Kalman filtering processing.

Figure 7:
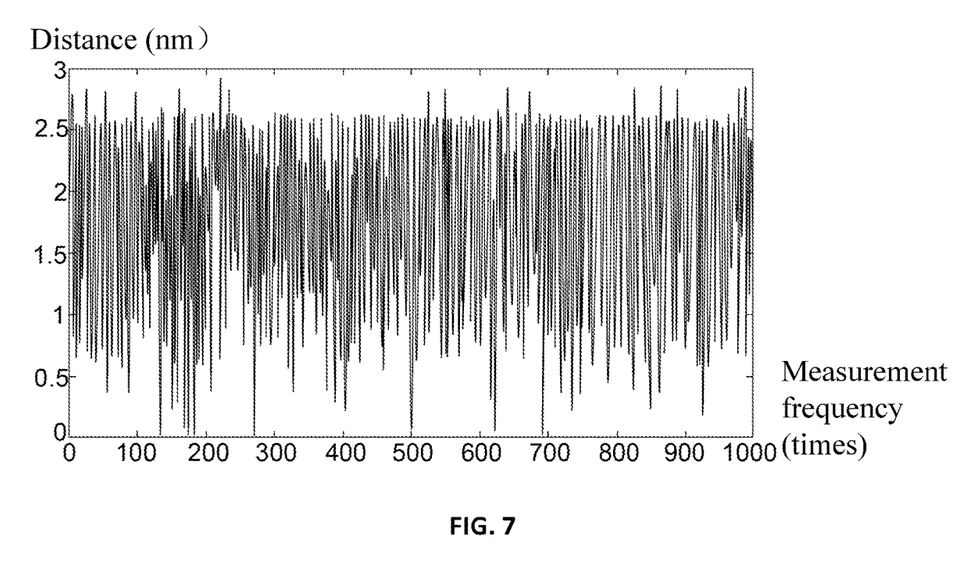
FIG. 7 is a comparison diagram of real-time displacement output results obtained before and after Kalman filtering processing in a high-accuracy, fast, and phase-based laser ranging method according to the present disclosure.

FIG. 7 is a comparison diagram of displacement results obtained by performing distance measurement on a specific fixed position for 1,000 times before and after Kalman filtering processing in step S7. In FIG. 7, a large-scale fluctuation curve is a displacement output result without performing Kalman filtering processing, that is, a mean filtering processing result $\overline{L}$ obtained in step S6, while a curve approximating a straight line is a displacement output result obtained by performing Kalman filtering processing, that is, a Kalman filtering processing result $\hat{L}$ obtained in step S7. It can be learned from two comparison results that, the displacement output result without performing Kalman filtering processing is jittered near a true value due to interference caused by unavoidable factors such as a circuit or the outside world, while the jitter is eliminated by performing Kalman filtering processing in step S5. Therefore, accuracy of output displacement data is improved.

Further, to verify stability of the data and improvement of accuracy of the high-accuracy, fast, and phase-based laser ranging method provided in the present disclosure, a phase-based laser rangefinder, an electronically controlled guide rail, a receiving target board for laser ranging, a computer, and a CMSIS-DAP-Link serial port tester are used as experimental materials for performing a test experiment. A control chip of the phase-based laser rangefinder carries a code program of the method provided in the present disclosure. A modulating frequency of the phase-based laser rangefinder is about 200 MHz, and precision of the electronically controlled guide rail is ±4 microns.

A specific experimental method includes: first fixing the phase-based laser rangefinder carrying the code program at one end of the electronically controlled guide rail, fixing the receiving target board for laser ranging at a movement end of the electronically controlled guide rail, where a plane of the receiving target board for laser ranging is perpendicular to a movement direction of the guide rail, and laser emitted by the laser rangefinder is vertically incidence to the receiving target board for laser ranging; transmitting data of the laser rangefinder to the computer through the CMSIS-DAP-Link serial port tester, and periodically controlling, by the computer, the guide rail to reciprocate; and after the foregoing preparatory work is completed, supplying power to the laser rangefinder until the number is stabilized, and then moving the electronically controlled guide rail to perform actual measurement. The electronically controlled guide rail moves, through the computer, to "80 mm" from "0 mm" and returns to "0 mm", and keeps for 30 seconds at each measurement point, with a single step length of 10 mm, repeating this step. The data is transmitted through the CMSIS-DAP-Link serial port tester, stored in the computer, and used to check stability and accuracy of all data at the end of the experiment. In addition, same experimental conditions are used, the phase-based laser rangefinder does not carry the software code of the method provided in the present disclosure, and the experiment is performed with original code of the phase-based laser rangefinder. Similarly, the data is transmitted through the CMSIS-DAP-Link serial port tester for performing final analysis.

Figure 8:
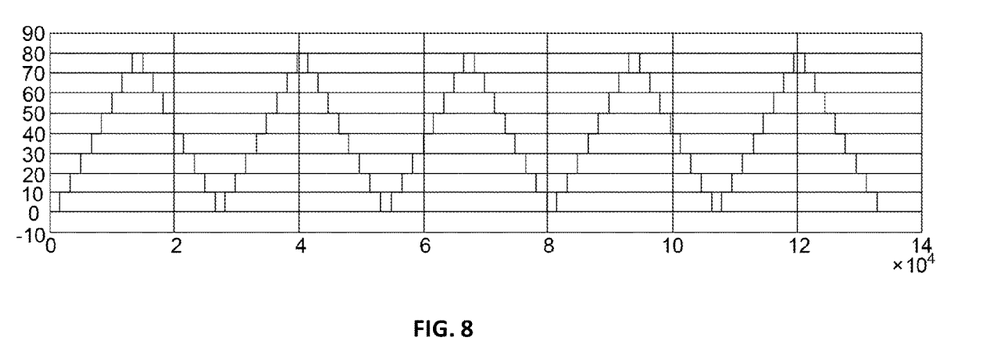
FIG. 8 is a curve of a distance test result obtained through a method used in a test in an embodiment of the present disclosure.
Figure 9:
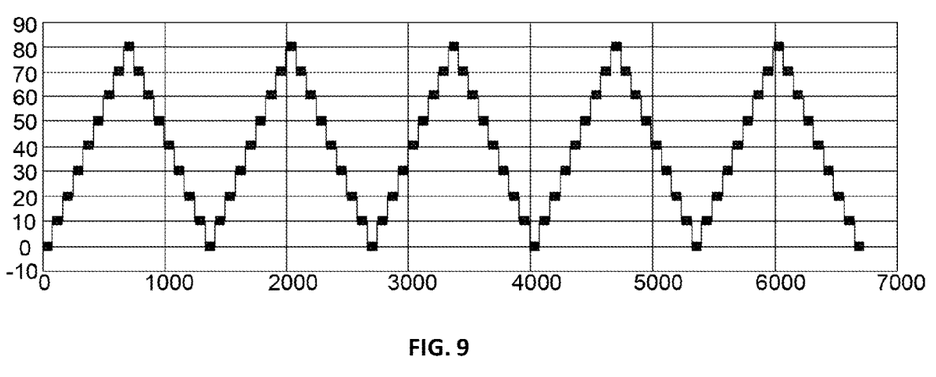
FIG. 9 is a curve of a distance test result obtained through an original method used in a test in an embodiment of the present disclosure.

FIG. 8 shows a curve of a distance test result obtained through the method provided in the present disclosure. It is a curve of a distance measurement result obtained after five circulations of "0→80 mm→0", where a y axis represents a measured distance value, an x axis represents a serial number of a distance measurement point. FIG. 9 shows a curve of a distance test result obtained through an original software method. It is a curve of a distance measurement result obtained after five circulations of "0→80 mm→0", where meanings of axes are the same as shown in FIG. 8.

It can be learned from comparison of the results in FIG. 8 and FIG. 9 that, jitter and noise at each distance measurement point obtained through the method provided in the present disclosure are smaller than jitter and noise obtained through the software method. In addition, standard deviations of the two sets of data are calculated. The standard deviation in FIG. 8 is ≤0.05, and the standard deviation in FIG. 9 is ≥0.6. It can be learned from stability of the data that the method in the present disclosure is superior to an existing method, and stability of the data is greatly improved. In addition, times and travels in two experiments are the same. The experimental result in FIG. 8 shows that the five circulations include 134,538 data points, and the experimental result in FIG. 9 shows that the five circulations include only 6,723 data points, showing that in a same period of time, a data output speed in the method provided in the present disclosure is 20 times faster than a data output speed of the existing method.

The invention claimed is:

1. A high-accuracy, fast, and phase-based laser ranging method, comprising:
   S1, transmitting a laser signal $f_1(t)$ to a to-be-measured object through a laser diode, receiving an echo signal $f_2(t)$ through an avalanche photon diode (APD), and performing frequency-mixing processing, to obtain an eigen signal $e_1(t)$ and an APD echo signal $e_2(t)$ whose phases are different and frequencies are the same;
   S2, performing, through an adaptive filtering method, denoising on the eigen signal $e_1(t)$ and the APD echo signal $e_2(t)$, to obtain a denoised eigen signal $e'_1(t)$ and a denoised APD echo signal $e'_2(t)$;
   S3, separately performing data splitting, reconstitution, and all-phase fast Fourier transform on the denoised eigen signal $e'_1(t)$ and the denoised APD echo signal $e'_2(t)$, to obtain an eigen signal frequency-phase spectral line $Y_1(K)$ of the eigen signal $e'_1(t)$ and an APD echo signal frequency-phase spectral line $Y_2(K)$, wherein step S3 specifically comprises:
   S301, substituting an array length n of a to-be-processed signal x(n)=[x(−N+1), . . . , x(0), . . . , x(N−1)] into a formula: n=2N−1, to obtain an integer result of N, and splitting an array of the to-be-processed signal into N subarrays, wherein each subarray comprises N pieces of data and center point data, and the center point data is one piece of data located at a center position of the subarray;

S302, arranging, in a manner of aligning with the center point data, the N subarrays obtained in step S301;

S303, performing periodic extension on the N subarrays based on the center point data, to obtain N subarrays with an array length of 2N−1;

S304, performing truncation, through a rectangular window with a length of N, on the N subarrays with an array length of 2N−1 backward starting from the center point data, to obtain N subarrays with an array length of N and that are located in the rectangular window; and S305, performing Fourier transform and summing by bits on the N subarrays obtained in step S304, to obtain a frequency-phase spectral line, with a formula as follows:

$$Y_r(K) = \sum_{r=0}^{N-1} w_c(r) S'_r(K) = \sum_{r=0}^{N-1} w_c(r) S_r(K) e^{j\frac{2\pi}{N} rk},$$

wherein $w_c$ represents a rectangular convolution window, $$w_c(n') = \begin{cases} \sum_{k=0}^{N-1-n'} w_1(k) w_2(k+n') & (n' \in [0, N-1]) \\ \sum_{k=-n'}^{N-1} w_1(k) w_2(k+n') & (n' \in [0, N-1]) \end{cases},$$

$w_1$ and $w_2$ represent convolution window functions, r represents a serial number of a subarray, k represents a serial number of data of the subarray, and K represents a value of a serial number of a spectral; $S'_r(K)$ represents results obtained by performing discrete fast Fourier transform on the subarrays obtained in step S304, $S_r(K)$ represents the subarrays obtained in step S301; and n' represents the array length of the subarray obtained in step S304;

S4, traversing the eigen signal frequency-phase spectral line $Y_1(K)$, to obtain a maximum phase value $\varphi_{1max}$; traversing the APD echo signal frequency-phase spectral line $Y_2(K)$, to obtain a maximum phase value $\varphi_{2max}$; and performing calculation based on a formula $\Delta\varphi = \varphi_{1max} - \varphi_{2max}$, to obtain a phase difference $\Delta\varphi$;

S5, substituting the phase difference $\Delta\varphi$ obtained in step S4 into a formula $$L = \frac{\Delta\varphi}{2\pi} \cdot \frac{c}{2 f_{Laser}},$$

to convert the phase difference $\Delta\varphi$ into a displacement L, wherein c represents a propagation speed of laser in atmosphere; $f_{Laser}$ represents a frequency for modulating a laser signal, and a substitution value of $f_{Laser}$ is the laser signal $f_1(t)$ in step S1;

S6, performing signal mean filtering processing on the displacement L obtained through solving in a time sequence in step S5, to obtain a mean filtering distance $\bar{L}$; and S7, performing Kalman filtering processing on the mean filtering distance $\bar{L}$ obtained in step S6, to obtain a Kalman filtering distance $\hat{L}$.

2. The high-accuracy, fast, and phase-based laser ranging method according to claim 1, wherein step S2 specifically comprises: separately substituting the eigen signal $e_1(t)$ and the APD echo signal $e_2(t)$ into an adaptive filtering formula:

$$\nabla J = \frac{\partial(e^2(n))}{\partial w(n)} = -2e(n)x(n)$$

$$y(n) = w^T(n)x(n)$$

$$e(n) = d(n) - y(n)$$

$$w(n+1) = w(n) - 2\mu \nabla J$$

$\nabla J$ represents a filter coefficient gradient; $x(n)$ represents a signal with sampling noise, that is, $e_1(t)$ and $e_2(t)$; $w(n)$ represents a digital filter; $d(n)$ represents a desired signal; $e(n)$ represents an error value; $y(n)$ represents an output signal, that is, the denoised eigen signal $e'_1(t)$ and the denoised APD echo signal $e'_2(t)$; n represents an array length of a signal; and $\mu$ represents a step factor.

3. The high-accuracy, fast, and phase-based laser ranging method according to claim 1, wherein the S6, performing signal mean filtering processing comprises: substituting the result obtained through solving in step S5 into a mean filtering processing formula:

$$\bar{L} = \frac{p}{2} \sum_{i=1}^{p/2} L_i,$$

wherein $\bar{L}$ represents a mean filtering distance, p represents a quantity of $L_i$ input within 1 s, and $L_i$ represents an $i^{th}$ distance value obtained through solving in a unit time, specifically the displacement L obtained through solving in a time sequence in step S5.

4. The high-accuracy, fast, and phase-based laser ranging method according to claim 3, where the S7, performing Kalman filtering processing comprises: determining the mean filtering distance $\bar{L}$ obtained in step S6 as an input for Kalman filtering, and substituting the mean filtering distance $\bar{L}$ into a Kalman filtering equation, wherein the Kalman filtering equation is as follows:

$$x_q = A x_{q-1} + B u_q,$$

$$z_q = H_q x_q + v_q,$$

$$P_{\bar{q}} = A P_{q-1} A^T + Q,$$

$$K_q = \frac{P_{\bar{q}} H^T}{H P_{\bar{q}} H^T + R},$$

$$\hat{x}_q = \hat{x}_{\bar{q}} + K_q(z_q - H\hat{x}_{\bar{q}}),$$

$$P_q = (I - K_q H) P_{\bar{q}}, \text{ wherein}$$

$x_q$ represents a prior distance value obtained by performing Kalman filtering processing at a time point q, A represents a target state transfer matrix, $x_{q-1}$ represents an input value without performing Kalman filtering processing at a time point q–1, and is specifically substituted into the processing result $\bar{L}$ obtained in step S6; B represents a matrix that converts an input distance into a state, $u_q$ represents a control vector, $z_q$ represents a measurement vector, H represents a transformation matrix from a state vector to a measurement vector, $v_q$ represents noise conforming to Gaussian distribution, $\hat{x}_{\bar{q}}$ represents a prior state estimation value at the time point q, and $\hat{x}_q$ represents an output value obtained by performing Kalman filtering processing at the time point q; $P_{\bar{q}}$ represents a covariance of $\hat{x}_{\bar{q}}$ at the time point q, $P_q$ represents a covariance of $\hat{x}_q$ at the time point q, $P_{q-1}$ represents a covariance of at the time point q–1, $A^T$ represents transpose of a state transfer matrix A, Q represents a covariance matrix of system noise, $K_q$ represents a Kalman gain, $H^T$ represents transpose of a matrix H, R represents a covariance matrix for ranging noise, and I represents a unit matrix; and the output result $\hat{x}_q$ is a distance value $\hat{L}$ obtained by performing Kalman filtering processing.

5. The high-accuracy, fast, and phase-based laser ranging method according to claim 4, wherein in step 7, the covariance matrix of system noise is Q=[0.02], and the covariance matrix for ranging noise is R=[10].

\* \* \* \* \*